(12) United States Patent
Katou

(10) Patent No.: US 10,160,421 B2
(45) Date of Patent: Dec. 25, 2018

(54) COMMUNICATION SYSTEM

(71) Applicant: DENSO CORPORATION, Kariya, Aichi-pref. (JP)

(72) Inventor: Kenji Katou, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/523,322

(22) PCT Filed: Nov. 27, 2015

(86) PCT No.: PCT/JP2015/005922
§ 371 (c)(1),
(2) Date: Apr. 28, 2017

(87) PCT Pub. No.: WO2016/092766
PCT Pub. Date: Jun. 16, 2016

(65) Prior Publication Data
US 2017/0327086 A1 Nov. 16, 2017

(30) Foreign Application Priority Data

Dec. 8, 2014 (JP) .................................. 2014-247589

(51) Int. Cl.
*G07C 9/00* (2006.01)
*B60R 25/24* (2013.01)
(Continued)

(52) U.S. Cl.
CPC ............ *B60R 25/241* (2013.01); *B60R 25/01* (2013.01); *B60R 25/245* (2013.01);
(Continued)

(58) Field of Classification Search
None
See application file for complete search history.

(56) References Cited

U.S. PATENT DOCUMENTS 8,232,863 B2 * 7/2012 Nakajima ............. B60R 25/245
340/5.61
9,185,528 B2 * 11/2015 Schwartz .................. G01S 1/08
(Continued)

FOREIGN PATENT DOCUMENTS

JP 2000-160895 A 6/2000
JP 2006070624 A 3/2006
(Continued)

*Primary Examiner* — K. Wong
(74) *Attorney, Agent, or Firm* — Harness, Dickey & Pierce, P.L.C.

(57) ABSTRACT

A communication system includes: a vehicle-mounted device; and a mobile device. The vehicle-mounted device includes: a vehicle side transmission device that transmits a request signal; a vehicle side receiver that receives an operation signal, transmitted from a mobile device side operation unit of the mobile device, and a response signal; and a vehicle side reception control device that controls the vehicle side receiver to receive the operation signal as a first channel signal, and to receive the response signal as a second channel signal. The mobile device includes: the mobile device side operation unit; a mobile device side reception device; and a mobile device side transmission device that transmits the operation signal as the first channel signal, and transmits the response signal as the second channel signal.

7 Claims, 11 Drawing Sheets

(51) Int. Cl.
*G08C 17/02* (2006.01)
*B60R 25/01* (2013.01)

(52) U.S. Cl.
CPC ........ *B60R 25/246* (2013.01); *G07C 9/00309* (2013.01); *G07C 9/00896* (2013.01); *G08C 17/02* (2013.01); *B60R 2325/20* (2013.01); *G07C 2009/0038* (2013.01); *G07C 2009/00547* (2013.01); *G07C 2009/00793* (2013.01)

(56) References Cited

U.S. PATENT DOCUMENTS

| | | | |
|---|---|---|---|
| 9,809,197 B2 * | 11/2017 | Miyazawa | ......... G07C 9/00309 |
| 2009/0102634 A1 | 4/2009 | Okada et al. | |
| 2011/0260831 A1 | 10/2011 | Ieda et al. | |

FOREIGN PATENT DOCUMENTS

| | | | |
|---|---|---|---|
| JP | 2008060942 A | 3/2008 | |
| JP | 2008144517 A | 6/2008 | |
| JP | 2010163756 A | 7/2010 | |
| JP | 4552995 B2 | 9/2010 | |
| JP | 2010283582 A | 12/2010 | |
| JP | 2013133649 A | 7/2013 | |
| JP | 5428320 B2 | 2/2014 | |

* cited by examiner

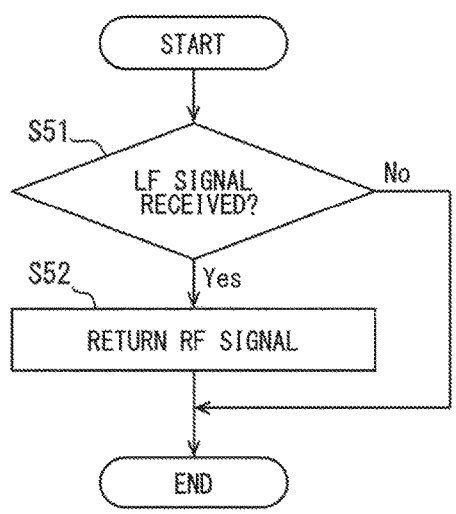

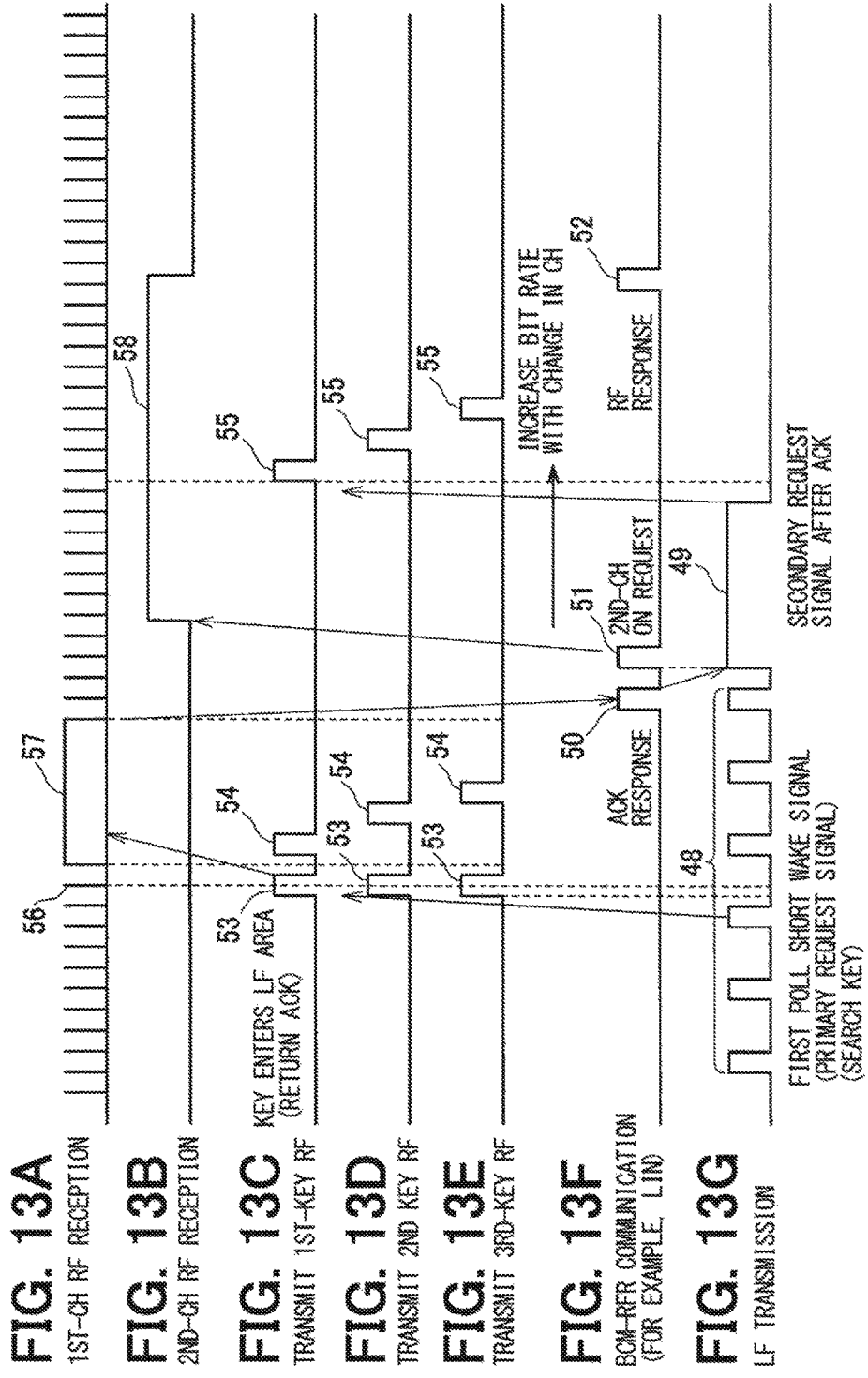

COMMUNICATION SYSTEM

CROSS REFERENCE TO RELATED APPLICATIONS

This application is a U.S. National Phase Application under 35 U.S.C. 371 of International Application No. PCT/JP2015/005922 filed on Nov. 27, 2015 and published in Japanese as WO 2016/092766 A1 on Jun. 16, 2016. This application is based on and claims the benefit of priority from Japanese Patent Application No. 2014-247589 filed on Dec. 8, 2014. The entire disclosures of all of the above applications are incorporated herein by reference.

TECHNICAL FIELD

The present disclosure relates to a communication system including a vehicle-mounted device mounted in a vehicle and a mobile device communicating with the vehicle-mounted device.

BACKGROUND ART

Up to now, a communication system that performs a wireless communication between a vehicle-mounted device mounted in a vehicle and a mobile device carried by a user has been known (for example, refer to Patent Literature 1). The communication system is applied to an electronic key system that permits locking and unlocking operation of, for example, a vehicle door. As the electronic key system, there is an RKE system (RKE: remote keyless entry) in which an operation signal is transmitted from the mobile device to the vehicle-mounted device on the basis of the operation of a lock button or an unlock button provided in the mobile device, and the vehicle-mounted device locks or unlocks the door on the basis of the operation signal.

In addition to the RKE system, there is an electronic key system (called PEPS system (PEPS: passive entry & passive starting), a smart entry system, and so on) in which a response signal is transmitted from a mobile device in response to a request signal from the vehicle-mounted device, and the vehicle-mounted device locks and unlocks the door on the basis of the response signal. Patent Literature 1 discloses the electronic key system in which a transmission period or a frequency band of search radio waves (request signals) that are periodically transmitted from the vehicle-mounted device is changed suitably in order to detect that the user carrying the mobile device approaches the vehicle. According to the above system, a power consumption can be suppressed, and keyless operation of the vehicle is performed without a delay of authentication of an ID code and with certainty and appropriate timing.

However, in the technique of Patent Literature 1, since an optimum control is not considered for the transmission and reception of the response signal to be transmitted from the mobile device to the vehicle-mounted device, a responsiveness of the response signal may be improved.

PRIOR ART LITERATURES

Patent Literature

Patent Literature 1: JP-A-2006-70624

SUMMARY

It is an object of the present disclosure to provide a communication system including a vehicle-mounted device and a mobile device, which is capable of improving a responsiveness of a response signal to be transmitted from the mobile device in response to a request signal from the vehicle-mounted device.

According to a first aspect of the present disclosure, a communication system includes: a vehicle-mounted device that is mounted in a vehicle; and at least one mobile device that is configured to communicate with the vehicle-mounted device. The vehicle-mounted device includes: a vehicle side transmission device that transmits a request signal for requesting a reply to an external periphery of the vehicle or a vehicle compartment; a vehicle side receiver that receives an operation signal, transmitted from the mobile device based on an event that a mobile device side operation unit of the mobile device is operated, and a response signal transmitted from the mobile device in response to the request signal, the operation signal and the response signal having a transmission distance set to be longer than a transmission distance of the request signal; and a vehicle side reception control device that controls the vehicle side receiver to receive the operation signal as a first channel signal set to have a first carrier frequency and a first bit rate, and to receive the response signal as a second channel signal set to have a second carrier frequency different from the first carrier frequency and a second bit rate larger than the first bit rate. The at least one mobile device includes: the mobile device side operation unit; a mobile device side reception device that receives a signal transmitted from the vehicle-mounted device; and a mobile device side transmission device that transmits the operation signal as the first channel signal when the mobile device side operation unit is operated, and transmits the response signal as the second channel signal when the mobile device side reception device receives the request signal.

According to the above communication system, the vehicle side receiver provided in the vehicle (vehicle-mounted device) is configured so as to receive both of the operation signal transmitted from the mobile device on the basis of the fact that the mobile device side operation unit of the mobile device has been operated and the response signal transmitted from the mobile device in response to the request signal of the vehicle-mounted device. Since the mobile device transmits the operation signal and the response signal as the signals of the different channels (first channel and second channel), and the vehicle side receiver receives those signals as the signals of the different channels, a crosstalk of the operation signal and the response signal can be suppressed. Further, since the bit rate of the response signal is set to be more than the bit rate of the operation signal, the responsiveness of the response signal can be improved. In addition, since the bit rate of the operation signal is less than the bit rate of the response signal, a noise tolerance of the operation signal long in the transmission distance can be ensured.

According to a second aspect of the present disclosure, a communication system includes: a vehicle-mounted device that is mounted in a vehicle; and a mobile device that is configured to communicate with the vehicle-mounted device. The vehicle-mounted device includes: a vehicle side receiver that receives a signal transmitted from the mobile device; a vehicle side transmission device that periodically transmits a primary request signal to an external periphery of the vehicle, and transmits a secondary request signal to the external periphery of the vehicle when the vehicle side receiver receives a primary response signal transmitted from the mobile device in response to the primary request signal; and a vehicle side reception control device that controls the vehicle side receiver to receive a secondary response signal transmitted from the mobile device as a signal having a bit rate larger than the primary response signal in response to the secondary request signal. The mobile device includes: a mobile device side reception device that receives a signal transmitted from the vehicle-mounted device; and a mobile device side transmission device that transmits the primary response signal when the mobile device side reception device receives the primary request signal, sets the bit rate of the secondary response signal to be larger than the primary response signal, and transmits the secondary response signal when the mobile device side reception device receives the secondary request signal.

According to the above communication system, the vehicle-mounted device transmits a secondary request signal when the vehicle-mounted device periodically transmits a primary request signal to the periphery of the vehicle, and receives a primary response signal transmitted from the mobile device in response to the primary request signal, that is, when the mobile device enters the transmission area of the request signal. In this situation, since the vehicle side receiver and the mobile device set the bit rate of the secondary response signal responsive to the secondary request signal to be more than that of the primary response signal, the responsiveness of the response signal (secondary response signal) when detecting an approach of the mobile device to the vehicle can be improved.

BRIEF DESCRIPTION OF DRAWINGS

The above and other objects, features and advantages of the present disclosure will become more apparent from the following detailed description made with reference to the accompanying drawings. In the drawings:

FIG. 8 is a flowchart of getting-off processing in the PEPS system to be executed by the key;

FIGS. 9A to 9D are timing charts of respective operation related to getting-off processing;

FIGS. 13A to 13G are timing charts of respective operation related to the approach detection processing.

EMBODIMENTS

Figure 1:
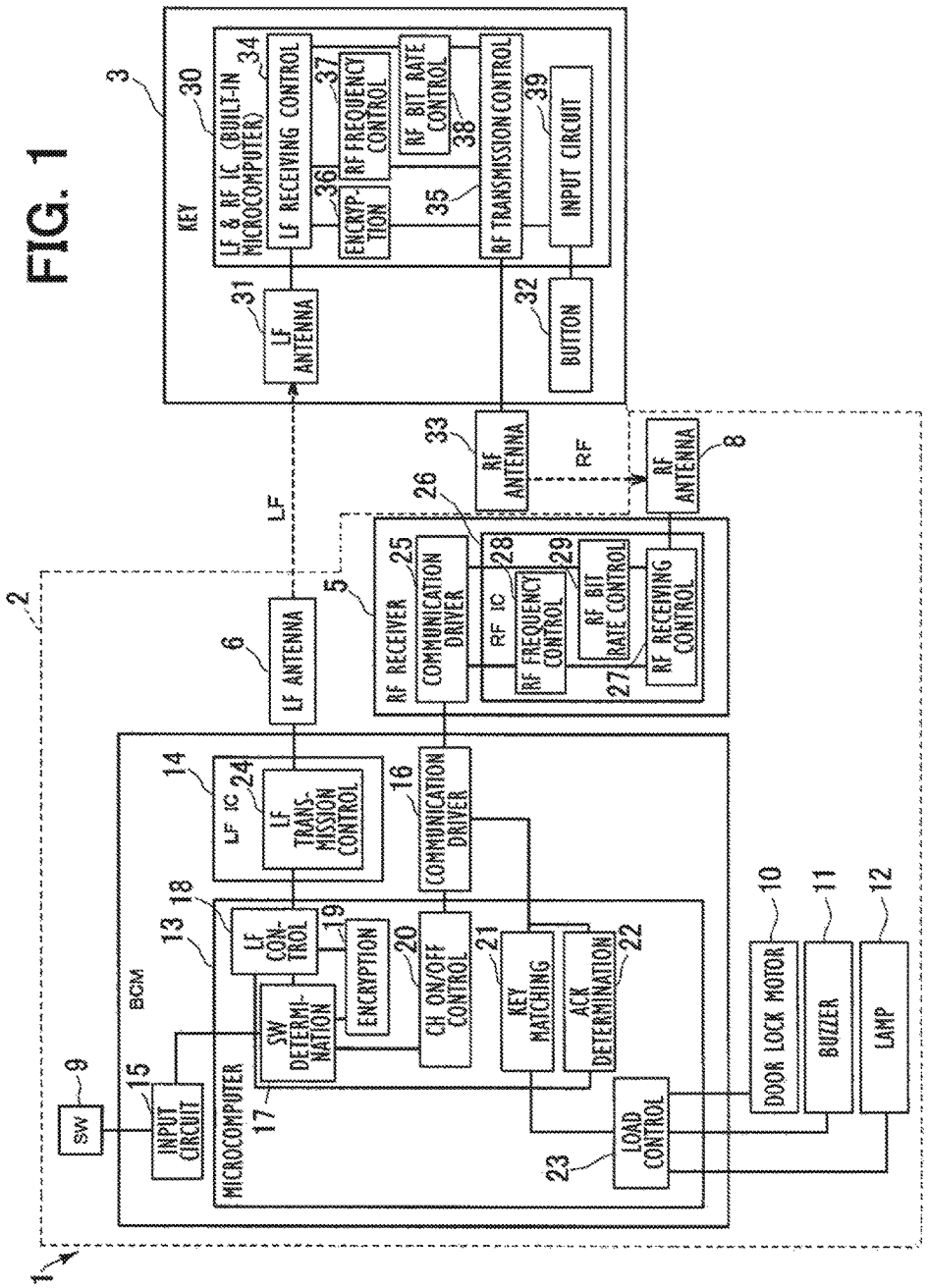
FIG. 1 is a configuration diagram of an electronic key system.

Hereinafter, embodiments of the present disclosure will be described with reference to the drawings. FIG. 1 illustrates a configuration diagram of an electronic key system 1 to which a communication system is applied according to the present disclosure. The electronic key system 1 includes a vehicle-mounted device 2 mounted in a vehicle 100 (refer to FIG. 2) and a key 3 as a mobile device carried by a user of the vehicle 100. The electronic key system 1 is compatible with both of a PEPS system that controls the locking and unlocking operation of a door of the vehicle 100 on the basis of a bidirectional communication between the vehicle-mounted device 2 and the key 3 and an RKE system that controls the locking and unlocking operation of the door on the basis of a unidirectional communication from the key 3 to the vehicle-mounted device 2. First, a configuration of the electronic key system 1 will be described.

The vehicle-mounted device 2 includes a BCM (body control module) 4, an RF receiver 5, LF antennas 6, a lock switch 9, a door lock motor 10, a buzzer 11, and a lamp 12.

Figure 2:
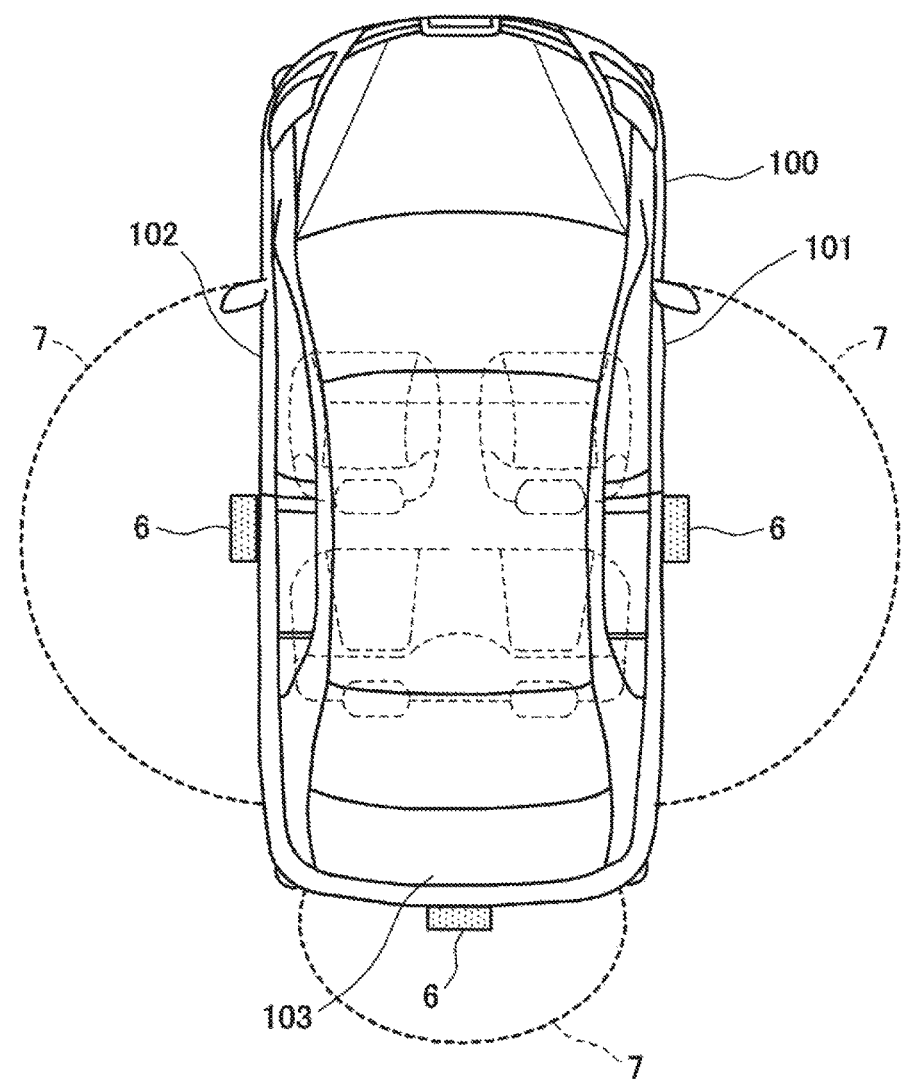
FIG. 2 is a top view of a vehicle illustrating an installation position of an LF antenna and a transmission area of an LF signal.

The LF antenna 6 is an antenna that transmits a request signal for requesting a reply to a periphery of the vehicle 100. The LF antenna 6 is configured as a resonance circuit having an antenna coil and a capacitor and transmits the request signal for requesting the reply at the time of resonating the resonance circuit as a radio wave having a frequency (for example, 125 kHz) of an LF band. As illustrated in FIG. 2, the LF antennas 6 are installed at multiple places of the vehicle 100, and specifically includes, for example, a right antenna 6a that is installed at a driver's seat door 101 or in the vicinity of the driver's seat door 101, a left antenna 6b that is installed at a front passenger's seat door 102 or in the vicinity of the front passenger seat door 102, and a rear antenna 6c that is installed at a trunk door 103 or in the vicinity of the trunk door 103. In order to detect a user who sits on the driver's seat or is left from the driver's seat, the right antenna 6a transmits the request signal to a right side periphery (periphery of the driver's seat door 101) of the vehicle 100. In order to detect the user who sits on a front passenger's seat or is left from the front passenger seat, the left antenna 6b transmits the request signal to a left side periphery (periphery of the front passenger seat door 102) of the vehicle 100. In order to detect the user who is to open and close the trunk door 103, the rear antenna 6c transmits the request signal to the periphery of the trunk door 103. Each of transmission areas 7 (transmission distances) of the request signals from the respective LF antennas 6a to 6c is set to, for example, a range of about 1 to 2 m from the respective LF antennas 6a to 6c. Incidentally, the vehicle 100 is also equipped with a vehicle interior LF antenna (not shown) that transmits the request signal to a vehicle interior in addition to the LF antennas 6a to 6c.

The RF receiver 5 corresponds to a receiver of the present disclosure and receives a signal (hereinafter referred to as "RF signal") of a radio wave (radio wave of, for example, 300 to 400 MHz) of an RF band transmitted from the key 3. The RF receiver 5 includes an RF antenna 8 that receives the RF signal from the key 3, an RFIC 26 that is connected to the RF antenna 8 and controls the reception of the RF signal, and a communication driver 25 that is connected to the RFIC 26 and performs a communication with the BCM 4.

The RFIC 26 has multiple processing units by functions, and specifically includes an RF reception control unit 27, an RF frequency control unit 28, and an RF bit rate control unit 29. Those control units 27 to 29 may be physically separated from each other, or the functions of those control units 27 to 29 may be realized by a single processing unit. The RF reception control unit 27 is configured to process the RF signal received by the RF antenna 8. More specifically, the RF reception control unit 27 includes a demodulation circuit that receives the RF signal received by the RF antenna 8 and demodulates the RF signal (analog signal) into a signal (digital signal) of a bit string, a filter circuit that removes noise from the RF signal, and so on.

In addition, the RF reception control unit 27 can receive the RF signals of two different predetermined carrier frequencies (two channels). More specifically, the RF reception control unit 27 includes receiving function units of two systems having a first receiving function unit that demodulates the RF signal of a first channel set to a first carrier frequency (for example, 433.5 MHz) so as to receive the RF signal of the first channel, and a second receiving function unit that demodulates the RF signal of a second channel set to a second carrier frequency (for example, 433 MHz) different from the first carrier frequency so as to receive the RF signal of the second channel.

Further, the RF reception control unit 27 can receive the RF signals of different two predetermined bit rates. Specifically, the RF reception control unit 27 receives the RF signal of the first channel as a signal of a first bit rate (for example, 3.9 kbps), and receives the RF signal of the second channel as a signal of a second bit rate (for example, 19.2 kbps) more than the first bit rate. For that reason, the first receiving function unit is configured to receive the signal of the first bit rate, and the second receiving function unit is configured to receive the signal of the second bit rate. As described above, the first channel is an RF signal channel set to the first carrier frequency and the first bit rate. The second channel is an RF signal channel set to the second carrier frequency and the second bit rate.

The RF frequency control unit 28 is configured to control the RF reception control unit 27 to receive the RF signal of a designated carrier frequency. More specifically, the RF frequency control unit 28 controls the operation of a function (first receiving function unit) for receiving the RF signal of the first carrier frequency and the operation of a function (second receiving function unit) for receiving the RF signal of the second carrier frequency in the RF reception control unit 27.

The RF bit rate control unit 29 is configured to control the RF reception control unit 27 to receive the RF signal of a designated bit rate. More specifically, the RF bit rate control unit 29 controls the operation of a function (first receiving function unit) for receiving the RF signal of the first bit rate and the operation of a function (second receiving function unit) for receiving the RF signal of the second bit rate in the RF reception control unit 27. As described above, the RF frequency control unit 28 and the RF bit rate control unit 29 control the operation of the receiving function for the first channel and the operation of the receiving function for the second channel in the RF reception control unit 27.

The communication driver 25 is connected to the BCM 4 through a communication line, transmits a modulated signal from the RFIC 26 to the BCM 4, receives the signal from the BCM 4, and inputs the received signal to the RFIC 26. The communication driver 25 performs a communication with the BCM 4 according to a communication protocol such as an LIN (local interconnect network) or a CAN (controller area network).

The lock switch 9 is an operation unit (for example, push switch) that is disposed in the vicinity of a door handle equipped, for example, on a vehicle outside of each door, for instructing the BCM 4 to locking (lock) the door. When the lock switch 9 is operated by the user, a signal indicating that the lock switch 9 is operated is input to the BCM 4. Meanwhile, the lock switch 9 corresponds to a vehicle side operation unit of the present disclosure.

The door lock motors 10 are disposed for the respective doors of the vehicle 100, operate lock mechanisms of the respective doors to a locking side or an unlocking side. The buzzer 11 is a device that outputs a sound for answering back (notifying) that the vehicle doors are locked or unlocked from a place away from the vehicle 100 by the key 3 to the vehicle exterior. The lamp 12 is a device such as a hazard flasher (emergency flashing light) for outputting a light to the outside of the vehicle, and used for the answer back in the present embodiment.

The BCM 4 is a device that governs the overall control of the vehicle side in the electronic key system 1 to transmit the request signal to the LF antennas 6 or to receive the signal received by the RF receiver 5 and operate the door lock motors 10, the buzzer 11, and the lamp 12 on the basis of the received signal. The BCM 4 includes a microcomputer 13 (hereinafter referred to as "microcomputer"), an LFIC 14, an input circuit 15, and a communication driver 16.

The LFIC 14 is a circuit that controls the transmission of an LF signal (request signal) from the LF antennas 6 on the basis of an instruction from the microcomputer 13. The LFIC 14 includes an LF transmission control unit 24. The LF transmission control unit 24 includes a driver circuit that drives the LF antennas 6 (resonance circuits), an oscillation circuit that generates an oscillation signal of the frequency of the LF band, and a conversion unit that mixes the request signal from the microcomputer 13 with the oscillation signal of the oscillation circuit to convert the request signal into a modulated signal (for example, ASK modulation).

The input circuit 15 is configured to receive an operation input of the lock switch 9, and when receiving the operation input, the input circuit 15 outputs a signal indicative of that fact to the microcomputer 13. The communication driver 16 is a device that performs a communication with the RF receiver 5 (communication driver 25) according to the communication protocol such as an LIN or a CAN. More specifically, the communication driver 16 receives the signal from the RF receiver 5 and outputs the received signal to the microcomputer 13, or receives the signal (channel control signal which will be described later) from the microcomputer 13 and transmits the received signal to the RF receiver 5.

The microcomputer 13 is a portion that includes a CPU, a ROM, a RAM, and so on, and governs the overall control of the BCM 4. The microcomputer 13 includes multiple processing units by functions, and specifically includes an SW determination unit 17, an LF control unit 18, an encryption unit 19, a CHON/OFF control unit 20, a key matching unit 21, an ACK determination unit 22, and a load control unit 23. Those processing units 17 to 23 may be physically separated from each other, or the functions of those processing units 17 to 23 may be realized by a single processing unit.

The SW determination unit 17 is a portion that is connected to the input circuit 15 and determines whether the lock switch 9 is operated, or not, on the basis of the signal input from the input circuit 15. The LF control unit 18 generates a bit string (for example, a bit string of 128 bits) of the request signal and transmits the generated bit string to the LFIC 14. The bit string of the request signal includes, for example, a unique ID unique to the key 3 and vehicle information as well as authentication information for authenticating whether the responded key 3 is a regular key, or not.

As the authentication of the key 3, for example, a challenge & response system is employed. In that case, the request signal including a random number (challenge code)

as the authentication information is transmitted from the vehicle-mounted device 2. The vehicle-mounted device 2 possesses the random number. When receiving the request signal, the key 3 subjects the random number included in the request signal to predetermined arithmetic processing to perform encryption (for example, encryption by an AES (advanced encryption standard), allows encrypted information (hereinafter referred to as "ID code") to be included in the response signal, and transmits the response signal to the vehicle-mounted device 2 as a response to the challenge. The encryption unit 19 of the vehicle-mounted device 2 subjects the random number possessed by the vehicle-mounted device 2 to predetermined arithmetic processing to perform the same encryption as that of the key 3. The key matching unit 21 matches an ID code included in the response signal against information (hereinafter referred to as "master ID code") encrypted by the encryption unit 19. If the matching is enabled, it is determined that the authentication of the key 3 is successful, and if the matching is disabled, it is determined that the authentication is unsuccessful. Incidentally, when the RF receiver 5 receives an RKE signal, the key matching unit 21 performs key matching based on the RKE signal.

Incidentally, the microcomputer 13 may decode the ID code included in the response signal and match the decoded information (random number) against the random number included in the request signal to perform the authentication of the key 3.

The CHON/OFF control unit 20 is a portion that controls the on/off operation of the second channel and transmits a channel control signal for instructing the second channel to turn on or off to the RF receiver 5 through the communication driver 16.

The ACK determination unit 22 is a portion that determines whether an ACK signal (acknowledgement) to be described later which is transmitted from the key 3 is present, or not. The load control unit 23 is a portion that controls the operation of the door lock motors 10, the buzzer 11, and the lamp 12 on the basis of the matching result by the key matching unit 21.

In addition to the above configuration, the vehicle-mounted device 2 includes, for example, an engine switch for instructing an accessory power supply and an ignition power supply of the vehicle to turn on, and instructing an engine to start. When the engine switch is disposed in the periphery of the driver's seat and operated by the user, the vehicle-mounted device 2 transmits the request signal from the vehicle interior LF antenna to the vehicle interior. The vehicle-mounted device 2 performs the authentication (matching of ID code) of the key 3 based on the response signal responsive to the request signal, and if the authentication is successful, the vehicle-mounted device 2 allows the accessory power supply and the ignition power supply to turn on, and the engine to start. In addition, the vehicle-mounted device 2 includes touch sensors (not shown) that are disposed in the door handles of the respective doors and detect that the user touches the respective door handles.

Next, a configuration of the key 3 will be described. The key 3 includes an IC 30, an LF antenna 31, a button 32, and an RF antenna 33. The LF antenna 31 is configured to receive the radio wave (request signal) of the LF band from the vehicle-mounted device 2. The LF antenna 31 is connected to the IC 30, and the signal received by the LF antenna 31 is input to the IC 30.

The button 32 is an operation unit (push switch) for instructing the vehicle doors to be locked or unlocked. The button 32 includes a lock button for instructing the vehicle doors to be locked and an unlocking button for instructing the vehicle doors to be unlocked. The button 32 is connected to the IC 30, and an operation signal of the button 32 is input to the IC 30. The RF antenna 33 is configured to transmit the response signal responsive to the request signal and the RKE signal (corresponding to the operation signal in the present disclosure) for instructing the vehicle doors to be locked or unlocked when the button 32 is operated as the RF signals. Meanwhile, the button 32 corresponds to an operation unit of the present disclosure.

The IC 30 is a portion for controlling the reception of the LF signal by the LF antenna 31 and the transmission of the RF signal by the RF antenna 33. The IC 30 includes multiple processing units by functions, and specifically includes an LF reception control unit 34, an RF transmission control unit 35, an encryption unit 36, an RF frequency control unit 37, an RF bit rate control unit 38, and an input circuit 39. Those processing units 34 to 39 may be physically separated from each other, or the functions of those processing units 34 to 39 may be realized by a single processing unit.

The LF reception control unit 34 is configured to control the reception of the LF signal received by the LF antenna 31. More specifically, the LF reception control unit 34 includes a demodulation circuit that receives the LF signal received by the LF antenna 31 and demodulates the LF signal (analog signal) into a signal (digital signal) of a bit string, a filter circuit that removes noise from the LF signal, and so on.

The RF transmission control unit 35 is configured to control the transmission of the RF signal by the RF antenna 33. The RF transmission control unit 35 generates a bit string of the signal to be transmitted by the RF antenna 33, modulates the bit string into a signal of the RF band, and allows the RF antenna 33 to transmit the modulated signal. When the LF antenna 31 receives the request signal, the RF transmission control unit 35 generates a bit string of the response signal responsive to the request signal. When the button 32 is operated, the RF transmission control unit 35 generates a bit string of the RKE signal for indicating the vehicle doors to be locked or unlocked according to a type of the operated button 32 (lock button or unlock button). Meanwhile, the response signal and the RKE signal include the unique ID unique to the key 3 and the ID code generated by the encryption unit 36.

The RF transmission control unit 35 controls a drive voltage of the RF antenna 33 so that a transmission distance of the RF signal is set to a distance (for example, a distance of about 100 m) longer than a transmission distance of the LF signal (request signal). Further, the RF transmission control unit 35 has transmission function units of two systems having a first transmission function unit that transmits the RF signal as the signal of the first channel (first carrier frequency, first bit rate), and a second transmission function unit that transmits the RF signal as the signal of the second channel (second carrier frequency, second bit rate).

The encryption unit 36 is a portion that encrypts the bit string of the RF signal to be transmitted by the RF antenna 33. More specifically, the encryption unit 36 subjects the random number (challenge code) included in the request signal to predetermined arithmetic processing to generate the ID code (encryption information), and allows the generated ID code to be included in the RF signal.

The RF frequency control unit 37 is configured to control the RF transmission control unit 35 to transmit the RF signal of a designated carrier frequency. More specifically, the RF frequency control unit 37 controls the operation of a transmitting function (first transmission function unit) of the RF signal of the first carrier frequency and the operation of a transmitting function (second transmission function unit) of the RF signal of the second carrier frequency in the RF transmission control unit 35.

The RF bit rate control unit 38 is configured to control the RF transmission control unit 35 to transmit the RF signal of a designated bit rate. More specifically, the RF bit rate control unit 38 controls the operation of a transmission function (first transmission function unit) of the RF signal of the first bit rate and the operation of a transmission function (second transmission function unit) of the RF signal of the second bit rate in the RF transmission control unit 35. As described above, the RF frequency control unit 37 and the RF bit rate control unit 38 control the operation of the transmitting function of the first channel and the operation of the transmission function of the second channel in the RF transmission control unit 35.

The input circuit 39 is configured to receive an operation input of the button 32, and when the operation input is present, the input circuit 39 outputs a signal indicative of that fact to the RF transmission control unit 35.

In the present embodiment, multiple (for example, three) keys 3 are provided. Each of the keys 3 has a unique ID, and the unique ID is stored in a memory (not shown) of the IC 30. In addition, each key 3 is registered in the BCM 4 in a form distinguished from the other keys 3. The unique IDs and registration numbers of the respective registered keys 3 are stored in a memory (not shown) of the BCM 4. The registration numbers are indicative of, for example, registration order. The unique ID as well as the registration number of the key 3 are stored in a memory of each key 3. Incidentally, a predetermined number (for example, 8) of keys 3 can be registered in the BCM 4 at a maximum.

Figure 3:
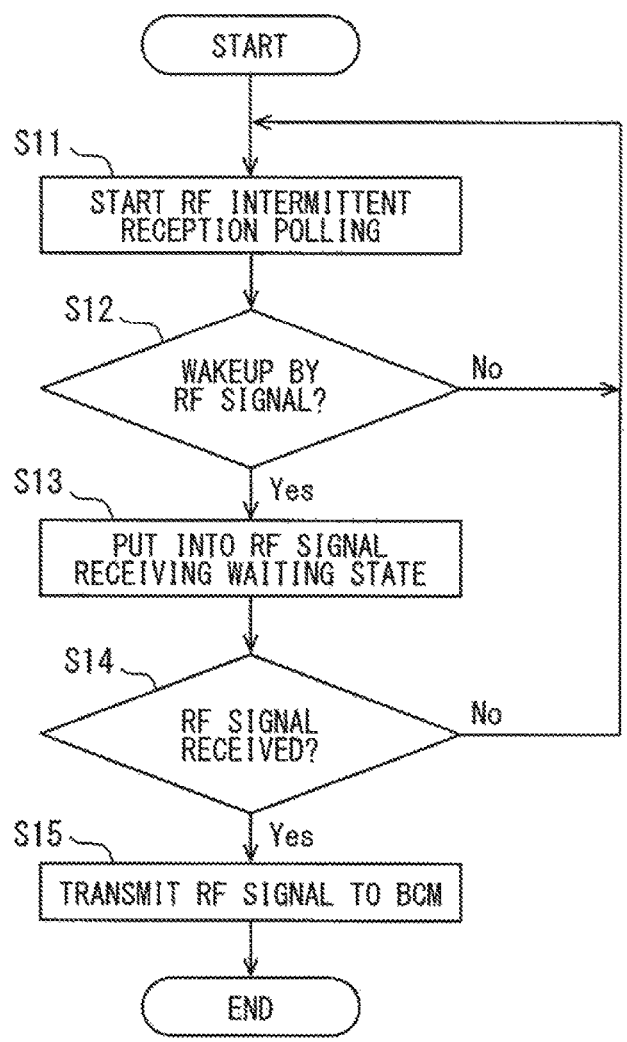
FIG. 3 is a flowchart of processing related to an RKE system to be executed by an RF receiver.
Figure 4:
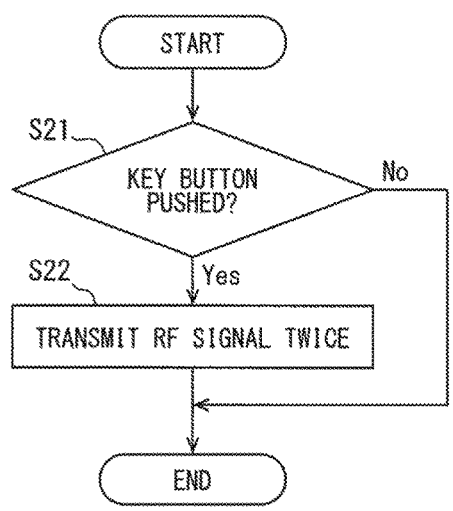
FIG. 4 is a flowchart of processing related to the RKE system to be executed by a key.
Figure 5:
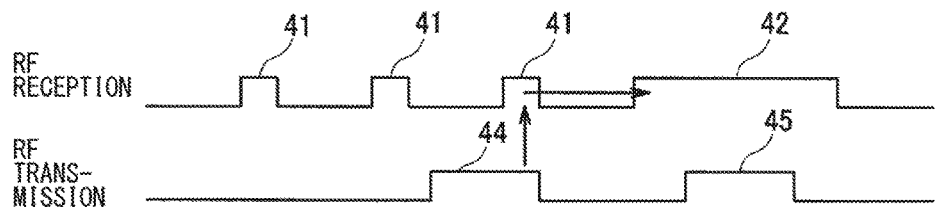
FIG. 5 is a timing chart illustrating the operation of transmitting and receiving an RF signal in the RKE system.

Next, details of the processing to be executed by the vehicle-mounted device 2 (BCM 4, RF receiver 5) and each key 3 will be described. First, the processing related to the RKE system will be described with reference to FIGS. 3 to 5. FIG. 3 is a flowchart of the processing related to the RKE system to be executed by the RFIC 26 of the RF receiver 5. FIG. 4 is a flowchart of the processing related to the RKE system to be executed by the IC 30 of the key 3. FIG. 5 is a timing chart illustrating the operation of transmitting and receiving the RF signal in the RKE system. In more detail, FIG. 5 illustrates a timing chart showing a signal receiving operation of the RF receiver 5 in the first channel at an upper stage, and a timing chart showing a transmission operation of the RF signal transmitted from the key 3 at a lower stage.

First, the processing on the key 3 side in FIG. 4 will be described. The key 3 performs intermittent operation while the processing is not executed, and the processing of FIG. 4 starts in the intermittent operation. When the processing of FIG. 4 starts, the IC 30 of the key 3 first determines whether the button 32 has been operated, or not (S21). If the button 32 has not been operated (no in S21), the processing of FIG. 4 is completed, and an intermittent operation mode is continued.

If the button 32 has been operated (yes in S21), the IC 30 switches from the intermittent operation mode to a continuous operation mode, and the RF transmission control unit 35 transmits the RF signal for instructing the vehicle doors to be locked or unlocked from the RF antenna 33 at predetermined intervals multiple times (S22). In the present embodiment, the RF transmission control unit 35 transmits the RF signal twice as represented by the timing chart on the lower stage of FIG. 5. The RF frequency control unit 37 instructs the RF transmission control unit 35 on the first carrier frequency as the carrier frequency of the RF signal. The RF bit rate control unit 38 instructs the RF transmission control unit 35 on the first bit rate as the bit rate of the RF signal. The RF transmission control unit 35 transmits the RF signal as the signal of the first carrier frequency and the first bit rate, that is, the signal of the first channel. Thereafter, upon completion of the processing in FIG. 4, the IC 30 again switches to the intermittent operation mode.

Next, the processing on the vehicle side in FIG. 3 will be described. The processing in FIG. 3 starts, for example, at the same time as that of an engine stop of the vehicle, and is thereafter repetitively executed at predetermined period intervals. When the processing of FIG. 3 starts, the RFIC 26 first starts the intermittent signal receiving operation (intermittent reception polling) of the first channel (S11). In other words, the RFIC 26 intermittently operates the receiving function (first receiving function unit of the RF reception control unit 27) for the signal of the first channel. The signal receiving operation of the second channel will be described later. Periods 41 on the upper stage of FIG. 5 indicate periods in which the signal is received during the intermittent reception polling, and a period 42 indicates a period in which the signal is received during the continuous operation mode.

Next, it is determined whether wake-up is performed by reception of the RF signal, or not (S12). FIG. 5 illustrates that a part of a first RF signal 44 transmitted from each key 3 has been received by the RF receiver 5 during the intermittent operation (periods 41). In that stage, since the RFIC 26 receives only a part of the RF signal 44, it cannot be determined whether the RF signal 44 is the RF signal from the key 3, or not.

If the RF signal has not been received in S12 (no in S12), the process is returned to S11, and the intermittent reception polling is continued. If it is determined that the wake-up is performed by the reception of the RF signal (yes in S12), as indicated by the period 42 in FIG. 5, the receiving function for receiving the signal of the first channel is switched to the continuous operation mode, and brought into a waiting state for reception of the RF signal (S13). In FIG. 5, the operation mode is switched to the continuous operation mode (period 42) with a predetermined reception stop period after the completion of the periods 41, but the operation mode may be switched to the continuous operation mode immediately without the reception stop period. As described above, the operation mode is switched to the continuous operation mode, thereby being capable of fully receiving at least one of the RF signals (RKE signals) transmitted from the key 3 at plural times.

Next, it is determined whether the RF signal from each key 3 has been received, or not (S14). FIG. 5 shows that all of a second RF signal 45 transmitted from the key 3 is received by the RF receiver 5 in the period 42. If the RF signal has not been received (no in S14), it is determined that the RF signal received in S12 is noise, and the operation mode is again switched to the intermittent reception polling (S11). On the other hand, if the RF signal has been received (yes in S14), the received RF signal is transmitted to the BCM 4 through the communication driver 25 (S15). Thereafter, the processing in the flowchart of FIG. 3 is completed.

The microcomputer 13 of the BCM 4 stops the operation during parking of the vehicle, and wakes up when the signal has been transmitted from the RF receiver 5. When the RF signal transmitted in S15 of FIG. 3 has been received, the microcomputer 13 matches the ID code included in the RF signal against a master ID code (key matching unit 21). If the matching is enabled, the microcomputer 13 (load control unit 23) controls the door lock motors 10 to lock or unlock the vehicle doors, and also operates the buzzer 11 and the lamp 12 for a short time to perform an answer back.

As described above, the transmission and reception of the RF signal between each key 3 and the RF receiver 5 in the RKE system are performed with the use of the first channel different from the channel (second channel) used in the PEPS system which will be described later.

Figure 6:
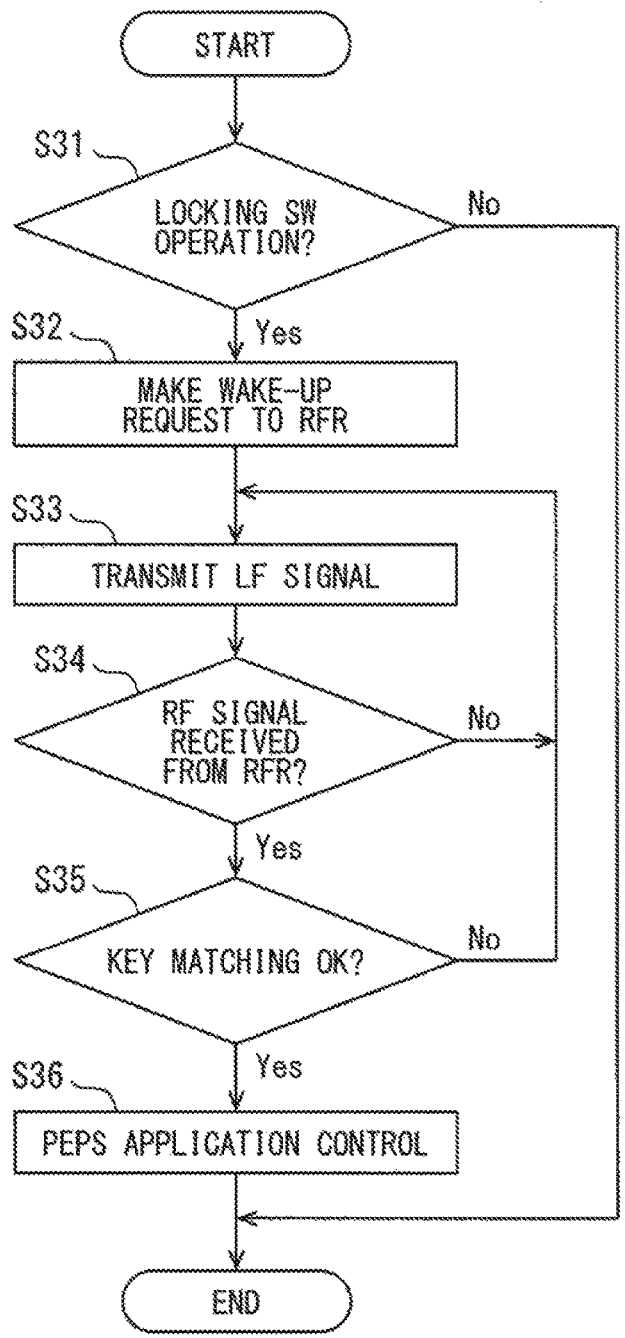
FIG. 6 is a flowchart of getting-off processing in a PEPS system to be executed by a BCM.
Figure 7:
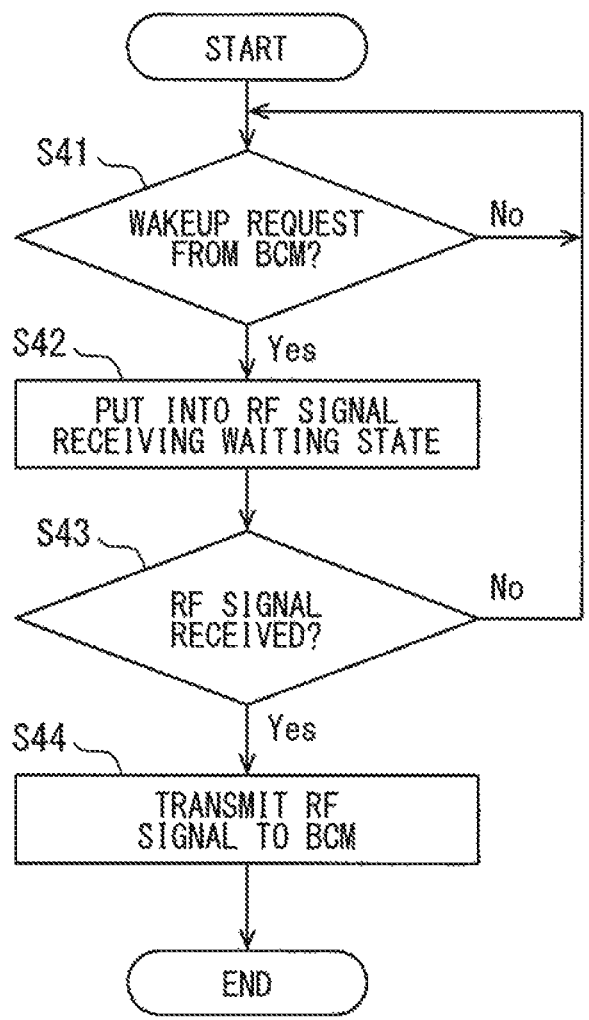
FIG. 7 is a flowchart of getting-off processing in the PEPS system to be executed by an RF receiver.

Next, as one of the processing related to the PEPS system, the processing (hereinafter referred to as "getting-off processing") when the user gets off the vehicle will be described with reference to FIGS. 6 to 9. FIG. 6 is a flowchart of the getting-off processing to be executed by the BCM 4 (microcomputer 13, LFIC 14). FIG. 7 is a flowchart of the getting-off processing to be executed by the RFIC 26 (RF receiver 5). FIG. 8 is a flowchart of the getting-off processing to be executed by the IC 30 (key 3). FIGS. 9A to 9D are timing charts of respective operation related to the getting-off processing. In more detail, the timing chart of FIG. 9A illustrates a timing of the signal receiving operation of the RF receiver 5 in the second channel. The timing chart in FIG. 9B illustrates a transmission timing of the RF signal (response signal) to be transmitted from the key 3. The timing chart of FIG. 9C illustrates a communication timing between the BCM 4 and the RF receiver 5. The timing chart of FIG. 9D illustrates a transmission timing of the LF signal (request signal) to be transmitted from the vehicle-mounted device 2.

First, the process in FIG. 6 will be described. The processing in FIG. 6 starts, for example, at the same time as that of the engine stop of the vehicle, and is thereafter repetitively executed at predetermined period intervals. When the processing of FIG. 6 starts, the microcomputer 13 determines whether the lock switch 9 has been operated, or not (S31). If the lock switch 9 has not been operated (no in S31), the processing in FIG. 6 is completed.

If the lock switch 9 has been operated (yes in S31), the CHON/OFF control unit 20 transmits a channel control signal for requesting the wake-up of the signal receiving operation of the second channel (continuous operation) to the RF receiver 5 through the communication driver 16 (S32). FIG. 9C illustrates that the channel control signal has been transmitted from the BCM 4 to the RF receiver 5 at timing when the lock switch 9 turns on.

In addition, the LF control unit 18 generates a bit string of the request signal and transmits the bit string to the LFIC 14 (S33). After the LFIC 14 has modulated the request signal, the LFIC 14 allows the LF antennas 6 to transmit the modulated bit string as a radio wave of the LF band (S33). FIG. 9D illustrates that the LF signal has been transmitted at the timing when the lock switch 9 turns on. Meanwhile, in S33, the LF signals may be transmitted from all of the LF antennas 6a to 6c illustrated in FIG. 2, or the LF signal may be transmitted from only the LF antenna 6a on the driver's seat side. When the LF signals are transmitted from all of the LF antennas 6a to 6c, in order to prevent the key 3 from receiving the multiple LF signals at the same time, for example, the LF signals are transmitted from the respective LF antennas 6a to 6c at staggered times.

Next, it is determined whether the RF signal (response signal) responsive to the request signal transmitted in S33 has been transmitted from the RF receiver 5, or not (S34). If the RF signal has not been received (no in S34), the process is returned to S33, and the LF signal is again transmitted. On the other hand, if the RF signal has been received (yes in S34), the key matching unit 21 matches the ID code included in the RF signal against the master ID code, and determines whether the matching is enabled, or not (S35). If the matching is disabled (no in S35), the process is returned to S33, and the LF signal is again transmitted.

The transmission of the LF signal in S33 is not performed indefinitely for many times while negative determination is made in S34 and S35. For example, when the LF signal has been transmitted a predetermined number of times (for example, twice), or when a predetermined time has elapsed from the operation of the lock switch 9, even if the negative determination has been made in S34 and S35, the LF signal is not transmitted, and the processing in FIG. 6 is completed. In that case, the vehicle doors are not locked on the assumption that the user does not possess the key 3 (for example, keeps the key 3 in the vehicle), and operates the lock switch 9.

If the key is enabled (yes in S35), the load control unit 23 executes an application control related to the PEPS so as to control the door lock motors 10 and lock the vehicle doors (S36).

Next, the processing on the key 3 side in FIG. 8 will be described. The processing of FIG. 8, the processing of FIG. 4, and the processing of FIG. 12 to be described later start during the intermittent operation of the key 3, and are executed in parallel. When the processing of FIG. 8 starts, the IC 30 determines whether to receive the LF signal (request signal), or not (S51). If the LF signal has not been received (no in S51), the processing of FIG. 8 is completed, and the intermittent operation mode is continued.

If the LF signal has been received (yes in S51), the IC 30 switches from the intermittent operation mode to the continuous operation mode, and the RF transmission control unit 35 and the encryption unit 36 generate the response signal including the ID code responsive to the request signal, and allow the response signal to be transmitted from the RF antenna 33 as the radio wave of the RF band (S52). In this situation, the RF frequency control unit 37 instructs the RF transmission control unit 35 on the second carrier frequency as the carrier frequency of the response signal. The RF bit rate control unit 38 instructs the RF transmission control unit 35 on the second bit rate as the bit rate of the response signal. The RF transmission control unit 35 transmits the response signal as the signal of the second carrier frequency and the second bit rate, in other words, the signal of the second channel. FIG. 9B illustrates that the response signal has been transmitted in response to the LF signal of FIG. 9D. Thereafter, the processing of FIG. 8 is completed, and the IC 30 again switches to the intermittent operation mode.

Next, the processing in the RF receiver 5 of FIG. 7 will be described. The processing in FIG. 7 starts, for example, at the same time as that of an engine stop of the vehicle, and is thereafter repetitively executed at predetermined period intervals. The processing of FIG. 7, the processing of FIG. 3, and the processing of FIG. 11 to be described later are executed in parallel.

As shown in a period 46 of FIG. 9A, the RFIC 26 stops the signal receiving operation of the second channel until the lock switch 9 is operated. When the processing of FIG. 7 starts, the RFIC 26 first determines whether the channel control signal that makes a request for wake-up of the signal receiving operation of the second channel has been transmitted from the BCM 4, or not (S41). If the channel control signal has not been received, in other words, if there is no request for the wake-up of the second channel (no in S41), the RFIC 26 waits for the request.

If there is the request for the wake-up of the second channel (yes in S41), in other words, if the channel control signal has been transmitted from the RF receiver 5 to the BCM 4 in S32 of FIG. 6, as shown in a period 47 of FIG.

9A, the signal receiving operation of the second channel is waked up (continuous operation), and brought into a waiting state for reception of the RF signal (response signal) (S42). In other words, the RF frequency control unit 28 instructs the RF reception control unit 27 to operate the receiving function for receiving the signal of the second carrier frequency. The RF bit rate control unit 29 instructs the RF reception control unit 27 to operate the receiving function for receiving the signal of the second bit rate. The RF reception control unit 27 wakes up the receiving function for receiving the signal of the second carrier frequency and the second bit rate, in other words, the signal of the second channel. Even if the response signals are transmitted from all of the keys 3 registered in the BCM 4 at staggered times among the keys 3, a period where the second channel is waked up is set in advance to a length in which all of those response signals can be received.

Next, it is determined whether the RF signal (response signal) from the key 3 has been received, or not (S43). FIGS. 9A and 9B illustrate that the RF signal has been received by the RF receiver 5 in the period 47. If the RF signal has not been received (no in S43), the process is returned to S41. On the other hand, when the RF signal has been received (yes in S43), the received RF signal is transmitted to the BCM 4 through the communication driver 25 (S44). The key matching is performed in the BCM 4 on the basis of the RF signal (S35 in FIG. 6). Thereafter, the processing in the flowchart of FIG. 7 is completed.

As described above, the transmission and reception of the RF signal between each key 3 and the RF receiver 5 at the time of getting-off vehicle (locking the doors) in the PEPS system are performed with the use of the second channel different from the first channel used in the RKE system which has been described above.

Figure 10:
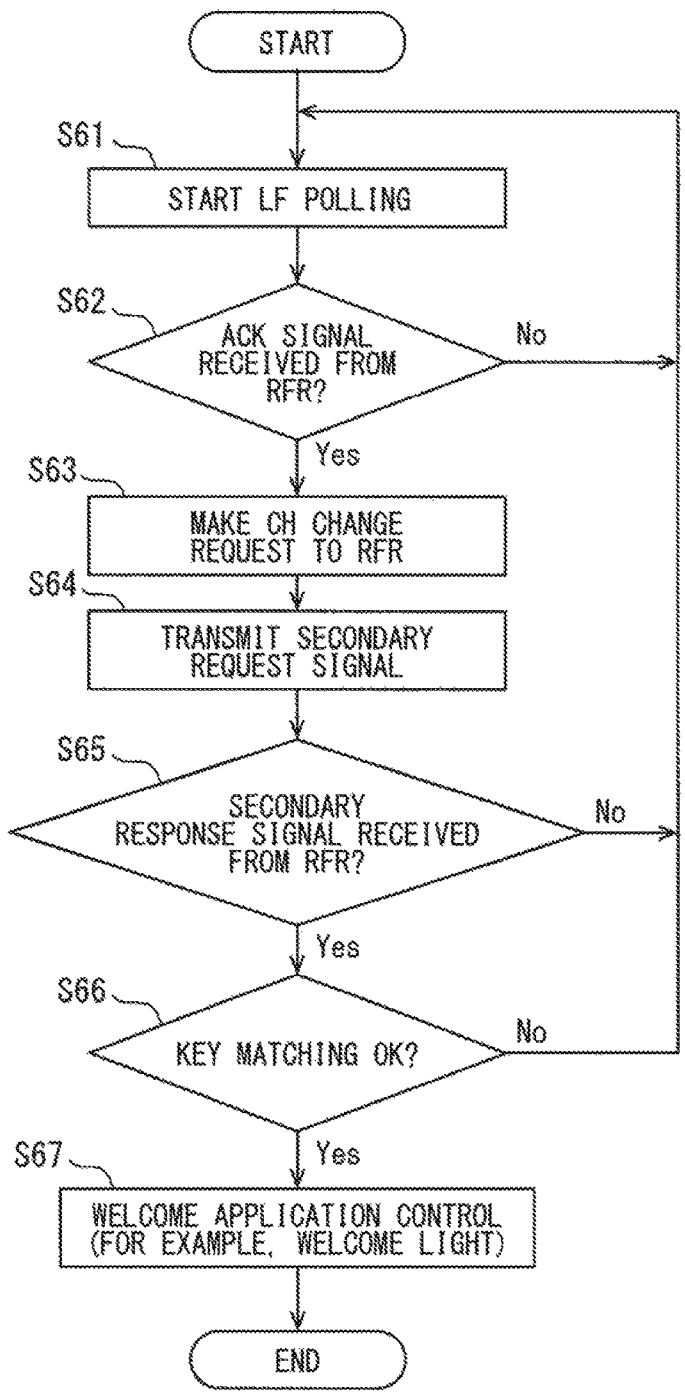
FIG. 10 is a flowchart of approach detection processing in the PEPS system to be executed by the BCM.
Figure 11:
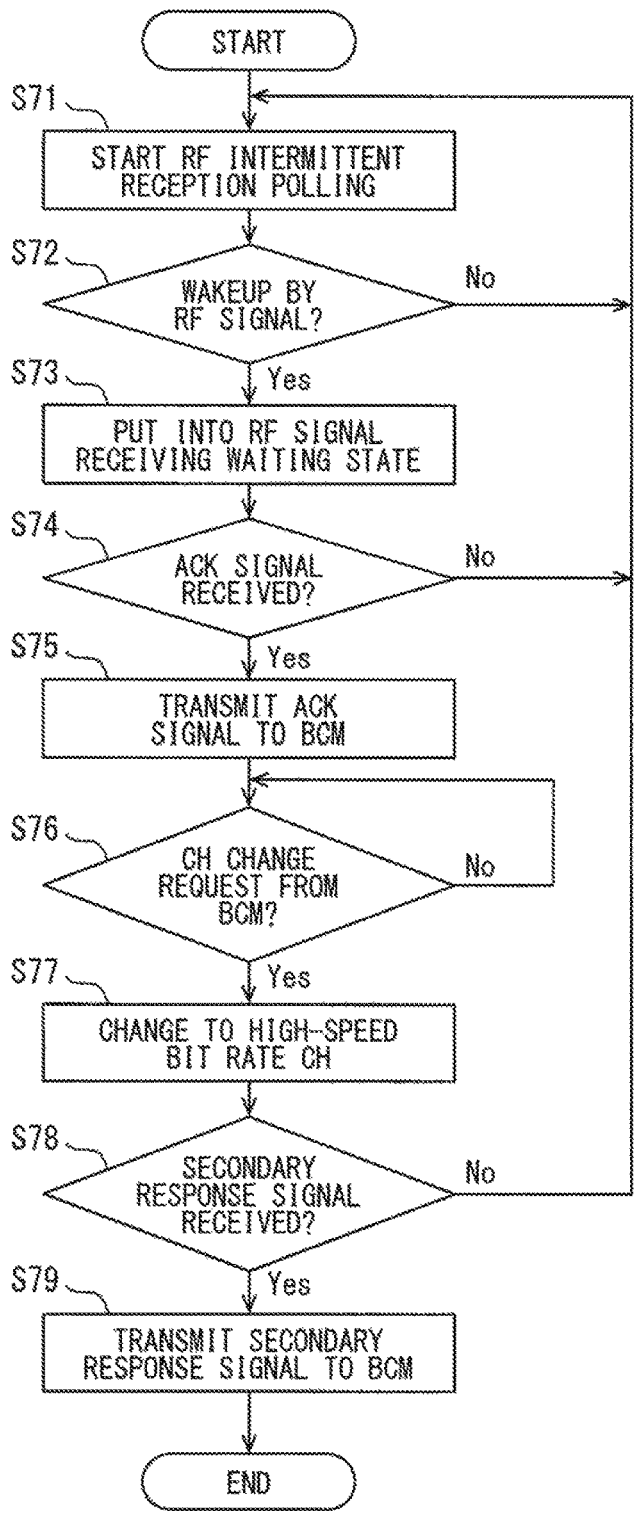
FIG. 11 is a flowchart of approach detection processing in the PEPS system to be executed by the RF receiver.
Figure 12:
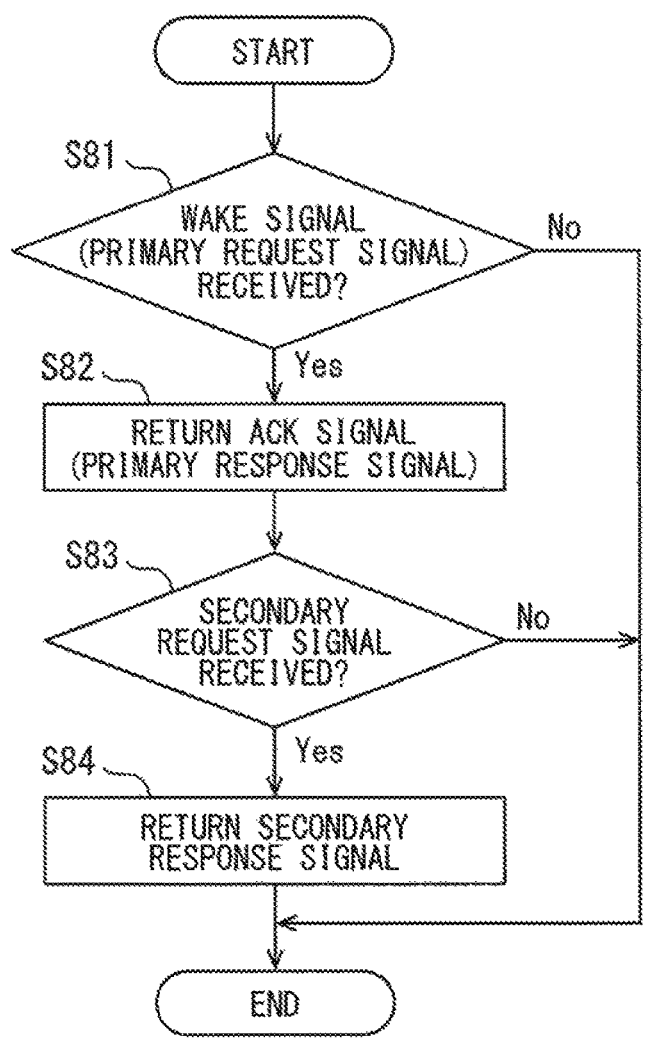
FIG. 12 is a flowchart of approach detection processing in the PEPS system to be executed by the key.

Next, as one of the processing related to the PEPS system, processing (hereinafter referred to as "approach detection processing") for detecting that the user carrying the key 3 approaches the vehicle for getting on the vehicle will be described with reference to FIGS. 10 to 13. FIG. 10 is a flowchart of the approach detection processing to be executed by the BCM 4 (microcomputer 13, LFIC 14). FIG. 11 is a flowchart of the approach detection processing to be executed by the RFIC 26 (RF receiver 5). FIG. 12 is a flowchart of the approach detection processing to be executed by the IC 30 (key 3).

FIGS. 13A to 13G are timing charts of respective operation related to the approach detection processing. FIGS. 13A to 13G illustrate timing charts in which three keys 3 are registered in the BCM 4, and those three keys 3 receive the LF signal from the vehicle at the same time. In more detail, the timing chart of FIG. 13A illustrates a timing of the signal receiving operation of the RF receiver 5 in the first channel. FIG. 13B illustrates a timing of the signal receiving operation of the RF receiver 5 in the second channel. FIG. 13C illustrates a timing of the RF signal to be transmitted from the key 3 (hereinafter referred to as "first key") of a registration number "1". FIG. 13D illustrates a timing of the RF signal to be transmitted from the key 3 (hereinafter referred to as "second key") of a registration number "2". FIG. 13E illustrates a timing of the RF signal to be transmitted from the key 3 (hereinafter referred to as "third key") of a registration number "3". FIG. 13F illustrates a communication timing between the BCM 4 and the RF receiver 5. FIG. 13G illustrates a transmission timing of the LF signal (request signal) to be transmitted from the vehicle-mounted device 2.

First, the process in FIG. 10 will be described. The processing in FIG. 10 starts, for example, when the user gets off the vehicle and the vehicle doors are locked after the engine stop of the vehicle, and is thereafter repetitively executed at predetermined period intervals. When the processing of FIG. 10 starts, in order to detect whether the key 3 enters any transmission area 7 (refer to FIG. 2) of the request signal, or not, the microcomputer 13 (LF control unit 18) and the LFIC 14 first start the polling (LF polling) of a WAKE signal as a primary request signal (S61). In other words, the microcomputer 13 generates a bit string of the WAKE signal including information for waking up the key 3 and the other information (vehicle information, the unique ID of the key 3, and so on). A bit length of the WAKE signal is set to a bit length (for example, 32 bits) shorter than a bit length (for example, 128 bits) of a secondary request signal to be described later. The microcomputer 13 transmits the generated bit string of the WAKE signal to the LFIC 14. After the LFIC 14 has modulated the bit string of the WAKE signal, the LFIC 14 allows the LF antennas 6 to transmit the modulated bit string as the radio wave of the LF band. The microcomputer 13 allows the LF antennas 6 to periodically transmit the WAKE signal. FIG. 13G illustrates a WAKE signal 48 transmitted in S61.

In S61, the microcomputer 13 allows the WAKE signals to be transmitted from all of the LF antennas 6a to 6c illustrated in FIG. 2. In this situation, in order to prevent the key 3 from receiving the multiple WAKE signals at the same time, for example, the WAKE signals are transmitted from the LF antennas 6a to 6c at staggered times.

Next, the ACK determination unit 22 of the microcomputer 13 determines whether the ACK signal as a primary response signal transmitted from the key 3 in response to the WAKE signal has been transmitted from the RF receiver 5, or not (S62). FIG. 13F illustrates an ACK signal 50 transmitted from the RF receiver 5 to the BCM 4 (microcomputer 13). When the ACK signal is not transmitted from the RF receiver 5 (no in S62), the process is returned to S61, and the polling of the WAKE signal is continued.

When receiving the ACK signal from the RF receiver 5 (yes in S62), the CHON/OFF control unit 20 transmits the channel control signal that makes a request for a change in the reception of the response signal from the first channel to the second channel, in other words, the channel control signal that makes a request for wake-up (continuous operation) of the operation of receiving the signal of the second channel to the RF receiver 5 through the communication driver 16 (S63). In the illustration of FIG. 13F, upon receiving the ACK signal 50, the microcomputer 13 transmits a channel control signal 51 that makes a request for wake-up of the second channel to the RF receiver 5.

In addition, the LF control unit 18 generates the bit string of the secondary request signal for authenticating the key 3 that has entered any transmission area 7 (refer to FIG. 2) of the LF signal, and transmits the generated bit string to the LFIC 14 (S64). After the LFIC 14 has modulated the bit string of the request signal, the LFIC 14 allows the LF antennas 6 to transmit the modulated bit string as the radio wave of the LF band (S64). The secondary request signal includes the challenge code (random number) for authenticating the key 3 and the other information (vehicle information, unique ID of the key 3), and is longer in the bit length than the WAKE signal. In the illustration of FIG. 13G, a secondary request signal 49 is transmitted upon receiving the ACK signal 50. In S64, the secondary request signal is transmitted from the LF antenna that has received the ACK signal among the LF antennas 6a to 6c in FIG. 2.

Next, it is determined whether a secondary response signal responsive to the secondary request signal has been transmitted from the RF receiver 5, or not (S65). In the illustration of FIG. 13G, a secondary response signal 52 is transmitted from the RF receiver 5 to the BCM 4. If the secondary response signal has not been received (no in S65), the process is returned to S61, and the WAKE signal is polled.

On the other hand, if the secondary response signal has been received (yes in S65), the key matching unit 21 matches the ID code included in the secondary response signal against the master ID code, and determines whether the matching is enabled, or not (S66). If the matching is disabled (no in S66), assuming that the regular key 3 could not be detected, the control returns to S61, and the WAKE signal is again polled.

If the key matching is enabled (yes in S66), the load control unit 23 executes a welcome application control, for example, for operating the lamp 12 for a short time, and giving notice of welcoming the getting-on of the user (S67). Also, in S67, the microcomputer 13 brings the touch sensors disposed in the door handles into a standby state, thereafter controls any door lock motor 10 when a corresponding touch sensor detects that the door handle is touched, and opens the touched door. Thereafter, the processing in the flowchart of FIG. 10 is completed.

Next, the processing on the key 3 side in FIG. 12 will be described. When the processing of FIG. 12 starts, the IC 30 determines whether to receive the WAKE signal (primary request signal, LF polling signal) transmitted in S61 of FIG. 10, or not (S81). If the WAKE signal has not been received (no in S81), the processing of FIG. 12 is completed, and the intermittent operation mode is continued.

When the key 3 enters any transmission area 7 (refer to FIG. 2) to receive the WAKE signal (yes in S81), the IC 30 switches from the intermittent operation mode to the continuous operation mode. The RF transmission control unit 35 generates the ACK signal responsive to the WAKE signal, and allows the ACK signal to be transmitted from the RF antenna 33 as the radio wave of the RF band (S82). In this situation, the RF frequency control unit 37 instructs the RF transmission control unit 35 on the first carrier frequency as the carrier frequency of the ACK signal. The RF bit rate control unit 38 instructs the RF transmission control unit 35 on the first bit rate as the bit rate of the ACK signal. Then, the RF transmission control unit 35 transmits the ACK signal as the signal of the first carrier frequency and the first bit rate, that is, the signal of the first channel.

Also, the RF transmission control unit 35 may transmit the ACK signal multiple times (for example, twice) upon receiving the WAKE signal once, or may transmit the ACK signal only once. Even when the ACK signal is transmitted only once upon receiving WAKE signal once, if the WAKE signal is received multiple times, the ACK signal is transmitted multiple times. FIGS. 13C to 13E illustrate that the two ACK signals 53 and 54 are transmitted from the respective first to third keys.

Further, in order to prevent the BCM 4 from receiving the ACK signals from the multiple keys 3 at the same time, the RF transmission control unit 35 differentiates at least one transmission timing of the ACK signals transmitted multiple times among the first key to the third key. Specifically, the RF transmission control unit 35 transmits the ACK signal at a timing corresponding to the registration number of the key 3 with reference to a timing to receive the WAKE signal. Alternatively, the RF transmission control unit 35 transmits a first ACK signal at the same timing among the first key to the third key, and transmits second and subsequent WAKE signals at the timing corresponding to the registration number of the key 3 with reference to the timing to transmit the first ACK signal. In this situation, for example, the transmission timing of the ACK signal is set to be earlier as the registration number is smaller. In FIGS. 13C to 13E, the first ACK signals 53 are transmitted at the same timing among the first key to the third key, and the second ACK signals 54 are transmitted at different timings among the first key to the third key.

Next, it is determined whether the secondary request signal transmitted in S64 of FIG. 10 has been received, or not (S83). If the secondary request signal has not been received (no in S83), the processing of FIG. 12 is completed, and the continuous operation mode is switched to the intermittent operation mode. If the secondary request signal has been received (yes in S83), the RF transmission control unit 35 and the encryption unit 36 generate the secondary response signal including the ID code responsive to the secondary request signal, and allow the secondary response signal to be transmitted from the RF antenna 33 as the radio wave of the RF band (S84). In this situation, the RF frequency control unit 37 instructs the RF transmission control unit 35 on the second carrier frequency as the carrier frequency of the secondary response signal. The RF bit rate control unit 38 instructs the RF transmission control unit 35 on the second bit rate as the bit rate of the secondary response signal. The RF transmission control unit 35 transmits the secondary response signal as the signal of the second carrier frequency and the second bit rate, in other words, the signal of the second channel.

Further, in order to prevent the BCM 4 from receiving the secondary response signals from the multiple keys 3 at the same time, the RF transmission control unit 35 differentiates the transmission timings of the secondary response signals among the first key to the third key. Specifically, the RF transmission control unit 35 transmits the secondary response signal at a timing corresponding to the registration number of the key 3 with reference to a timing to receive the secondary request signal. In this situation, for example, the transmission timing of the secondary response signal is set to be earlier as the registration number is smaller. FIGS. 13C to 13E illustrate the secondary response signals 55 transmitted at different timings among the first key to the third key. Thereafter, the processing of FIG. 12 is completed, and the IC 30 again switches to the intermittent operation mode.

Next, the processing in the RF receiver 5 of FIG. 11 will be described. The processing in FIG. 11 starts, for example, when the user gets off the vehicle and the vehicle doors are locked after the engine stop of the vehicle, and is thereafter repetitively executed at predetermined period intervals. When the processing of FIG. 11 starts, the RFIC 26 first starts the intermittent signal receiving operation (intermittent reception polling) of the first channel (S71). In other words, the receiving function for receiving the signal of the first channel is intermittently operated. The operation of receiving the signal of the second channel is stopped.

Next, it is determined whether wake-up is performed by reception of the RF signal, or not (S72). In the illustration of FIGS. 13A to 13G, the first ACK signals 53 transmitted from the first key to the third key are received by the RF receiver 5 as the signals of the first channel in the intermittent operation (period 56 of FIG. 13A) of the first channel. In that stage, since the RFIC 26 receives only a part of the ACK signal 53, it cannot be determined whether the ACK signal 53 is the ACK signal from the key 3, or not.

If the RF signal has not been received in S72 (no in S72), the process is returned to S71, and the intermittent reception polling of the first channel is continued. If it is determined that the wake-up is performed by the reception of the RF signal (yes in S72), as indicated by a period 57 in FIG. 13A, the receiving function for receiving the signal of the first channel is switched to the continuous operation mode, and brought into a waiting state for reception of the RF signal (S73). In FIG. 13A, the operation mode is switched to the continuous operation mode (period 57) with a predetermined reception stop period after the completion of the period 56, but the operation mode may be switched to the continuous operation mode immediately without the reception stop period. Even if the WAKE signals are transmitted from all of the keys 3 registered in the BCM 4 at staggered times among the keys 3, the period 57 of the continuous operation mode is set in advance to a length in which all of the ACK signals can be received.

Next, it is determined whether the ACK signal transmitted in S82 of FIG. 12 has been received, or not (S74). In the illustration of FIGS. 13A to 13G, the second ACK signal 54 transmitted from the first key to the third key is received by the RF receiver 5 in the period 57. If the ACK signal has not been received in (no in S74), the process is returned to S71, and the operation mode is again switched to the intermittent reception polling. On the other hand, if the ACK signal has been received (yes in S74), the received ACK signal is transmitted to the BCM 4 through the communication driver 25 (S75). In the illustration of FIGS. 13A to 13G, the ACK signal 50 is transmitted from the RF receiver 5 to the BCM 4 after the completion of the period 57. The ACK signals transmitted from the respective keys 3 are the same as each other in the keys 3. For that reason, in S75, when the ACK signals have been received from the multiple keys 3, one of those ACK signals may be transmitted to the BCM 4.

Next, it is determined whether the channel control signal that makes a request for a change in the reception of the response signal from the first channel to the second channel has been transmitted from the BCM 4, or not (S76). If the channel control signal has not been received (no in S76), the RF reception control unit 27 waits for the reception of the channel control signal. If the channel control signal has been received (yes in S76), that is, if the BCM 4 has transmitted the channel control signal in S63 of FIG. 10, the RF receiving control unit 27 changes the operation of receiving the response signal to the second channel higher in the bit rate than the first channel (S77). In other words, the RF reception control unit 27 allows the operation of receiving the signal of the second channel to be waked up (continuous operation) and puts into a waiting state for reception of the RF signal (response signal), on the basis of instructions from the RF frequency control unit 28 and the RF bit rate control unit 29. Even if the secondary response signals are transmitted from all of the keys 3 registered in the BCM 4 at staggered times among the keys 3, a period 58 of the continuous operation mode in FIG. 13B is set in advance to a length in which all of those secondary response signals (secondary response signals 55 in FIGS. 13C to 13E) can be received.

Meanwhile, even after the RF reception control unit 27 has waked up the operation of receiving the signal of the second channel, the RF reception control unit 27 continues the intermittent reception polling of the first channel. With the above configuration, even if the RKE signal based on the operation of the button 32 is transmitted from the key 3 during the operation of the second channel, the RF receiver 5 can receive the RKE signal as the signal of the first channel. The vehicle-mounted device 2 can rapidly execute the processing based on the RKE signal even during the operation of the PESP system.

Then, it is determined whether the secondary response signal transmitted from the key 3 in S84 of FIG. 12 has been received in the period 58 of receiving the signal of the second channel, or not (S78). In the illustration of FIGS. 13A to 13G, all of the secondary response signals 55 transmitted from the first key to the third key have been received by the RF receiver 5 as the signals of the second channel in the period 58. If the secondary response signal has not been received (no in S78), the process returns to S71.

On the other hand, if the secondary response signal has been received (yes in S78), the received secondary response signal (secondary response signal 52 in FIG. 13F) is transmitted to the BCM 4 through the communication driver 25 (S79). The BCM 4 distinguishes from which of the multiple keys 3 the secondary response signal is transmitted, and performs the key matching. In other words, the secondary response signals are different from each other among the multiple keys 3. For that reason, when the RF receiver 5 receives the secondary response signals from the multiple keys 3, the RF receiver 5 transmits all of the received secondary response signals to the BCM 4. In that case, the BCM 4 performs the key matching on all of the secondary response signals in S66 of FIG. 10, and executes the welcome application control when at least one matching is enabled (S67). After S79, the processing in a flowchart of FIG. 11 is completed.

As has been described above, according to the present embodiment, the RF signals (RKE signals) in the RKE system described with reference to FIGS. 3 to 5 and the RF signals (response signals) in the PEPS system (getting-off processing) described with reference to FIGS. 6 to 9 are transmitted and received through the channels different from each other. Therefore, even if the RKE signals and the response signals are transmitted and received at the same time, a crosstalk of the RKE signals and the response signals can be suppressed.

In addition, as has described with reference to FIGS. 3 to 5, since the RKE signal is transmitted and received at the bit rate lower than that of the response signal, even if the transmission distance is long (for example, about 100 m), an influence of noise on the RKE signal can be reduced. In other words, a noise tolerance of the RKE signal can be ensured. Conversely, since the response signal shorter in the transmission distance than the RKE signal is transmitted and received at the bit rate higher than that of the RKE signal, a responsiveness of the response signal can be improved. More particularly, even if the response signals are transmitted from the multiple keys 3, since the bit rate is high, all of the response signals can be received by the RF receiver 5 in a short time.

As has been described with reference to FIGS. 6 to 9, in the getting-off processing, since the receiving function of the second channel in the RF receiver 5 stops until the lock switch 9 is operated, in other words, since the receiving function of the second channel is operated only when the lock switch 9 is operated, a current consumption in the RF receiver 5 can be reduced.

In addition, as has been described with reference to FIGS. 10 to 13, in a scene where an approach of the key 3 to the vehicle is detected, it is detected that the key 3 enters the transmission area of the LF signal with the use of the first channel low in the bit rate, and since the operation of the second channel is stopped until then, the current consumption in the RF receiver 5 can be reduced. Since the first channel is intermittently operated, not only the approach of the key 3 can be detected, but also the RKE signal can be received. Further, when the key 3 enters the transmission area of the LF signal, since the secondary response signal for authentication of the key 3 is transmitted and received with the use of the second channel high in the bit rate, the responsiveness of the secondary response signal can be improved. In particular, even if the secondary response signals are transmitted from the multiple keys 3, since the bit rate is high, all of the secondary response signals can be received by the RF receiver 5 in a short time.

The present disclosure is not limited to the embodiments described above, and can be variously modified without departing from the spirit of the present disclosure. For example, in the above embodiment, in the case of FIGS. 6 to 9, the operation of receiving the signal of the second channel in the RF receiver stops until the lock switch is operated (the case of FIGS. 6 to 9), but may be intermittently operated until the lock switch is operated. Even with the above configuration, the current consumption can be reduced as compared with a case where the signal receiving operation is continuously performed.

In addition, in FIGS. 6 to 9, the second channel is operated by the operation of the lock switch, but the second channel may be operated by the operation of the engine switch for starting the engine. In that case, when the engine switch is operated, the vehicle-mounted device transmits the request signal from the vehicle interior LF antenna into vehicle, and the RF receiver operates the receiving function of the second channel. When the key has received the request signal from the vehicle interior LF antenna, the key transmits the response signal responsive to the request signal as the signal of the second channel. Similarly, with the above configuration, the responsiveness of the response signal can be improved, and the current consumption can be reduced since the second channel stops the operation until the engine switch is operated.

In addition, in FIGS. 10 to 13, the secondary response signal is transmitted and received at the carrier frequency different from that of the primary response signal. Alternatively, the secondary response signal may be transmitted and received at the same carrier frequency as that of the primary response signal and with a change in only the bit rate. Similarly, with the above configuration, the responsiveness of the secondary response signal can be improved. In addition, in the above embodiment, the RKE signal is used as a signal for instructing the vehicle doors to be locked or unlocked, but the RKE signal may be used as a signal for controlling another device (for example, a signal for instructing the engine to start, a signal for instructing a window to be opened and closed, and so on).

Incidentally, in the above embodiment, the BCM 4 and the LF antennas 6 that execute the processing in S31 and S33 of FIG. 6 and S61, S62, and S64 of FIG. 10 correspond to a vehicle side transmission device according to the present disclosure. The RFIC 26 and the CHON/OFF control unit 20 that execute the processing in FIGS. 3, 7, and 11 correspond to the reception control device according to the present disclosure. The LF antenna 31 and the LF reception control unit 34 correspond to the reception device according to the present disclosure. The IC 30 and the RF antenna 33 that execute the processing in FIGS. 4, 8, and 12 correspond to a mobile device side transmission device according to the present disclosure.

It is noted that a flowchart or the processing of the flowchart in the present application includes sections (also referred to as steps), each of which is represented, for instance, as S11. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A communication system comprising:
   a vehicle-mounted device that is mounted in a vehicle; and
   at least one mobile device that is configured to communicate with the vehicle-mounted device, wherein:
   the vehicle-mounted device includes:
      a vehicle side transmission device that transmits a request signal for requesting a reply to an external periphery of the vehicle or a vehicle compartment;
      a vehicle side receiver that receives an operation signal, transmitted from the mobile device based on an event that a mobile device side operation unit of the mobile device is operated, and a response signal transmitted from the mobile device in response to the request signal, the operation signal and the response signal having a transmission distance set to be longer than a transmission distance of the request signal; and
      a vehicle side reception control device that controls the vehicle side receiver to receive the operation signal as a first channel signal set to have a first carrier frequency and a first bit rate, and to receive the response signal as a second channel signal set to have a second carrier frequency different from the first carrier frequency and a second bit rate larger than the first bit rate; and
   the at least one mobile device includes:
      the mobile device side operation unit;
      a mobile device side reception device that receives a signal transmitted from the vehicle-mounted device; and
      a mobile device side transmission device that transmits the operation signal as the first channel signal when the mobile device side operation unit is operated, and transmits the response signal as the second channel signal when the mobile device side reception device receives the request signal;
   wherein:
   the vehicle-mounted device further includes a vehicle side operation unit;
   the vehicle side transmission device transmits the request signal when the vehicle side operation unit is operated; and
   the vehicle side reception control device stops or intermittently performs a signal receiving operation of the second channel signal in the vehicle side receiver until the vehicle side operation unit is operated, and switches the signal receiving operation of the second channel signal to a continuous operation when the vehicle side operation unit is operated.

2. The communication system according to claim 1, wherein:
the mobile device side transmission device transmits the operation signal a plurality of times by one operation of the mobile device side operation unit;
the vehicle side reception control device intermittently performs the signal receiving operation of the first channel signal in the vehicle side receiver until receiving the first channel signal, and switches the signal receiving operation of the first channel signal to a continuous operation when first receiving the signal during an intermittent operation.

3. The communication system according to claim 1, wherein:
the vehicle side transmission device periodically transmits a primary request signal to the external periphery of the vehicle, and transmits a secondary request signal to the external periphery of the vehicle when the vehicle side receiver receives a primary response signal transmitted from the mobile device in response to the primary request signal;
the mobile device side transmission device transmits the primary response signal as the first channel signal when the mobile device side reception device receives the primary request signal, and transmits a secondary response signal as the second channel signal when the mobile device side reception device receives the secondary request signal; and
the vehicle side reception control device intermittently performs the signal receiving operation of the first channel signal, stops the signal receiving operation of the second channel signal in the vehicle side receiver until receiving the primary response signal, and starts the signal receiving operation of the second channel signal in the vehicle side receiver when the vehicle side receiver receives the primary response signal.

4. The communication system according to claim 1, wherein:
the at least one mobile device includes a plurality of mobile devices.

5. The communication system according to claim 4, wherein:
the mobile device side transmission device of each mobile device transmits the response signal at a timing different from another mobile device.

6. A communication system comprising:
a vehicle-mounted device that is mounted in a vehicle; and
a mobile device that is configured to communicate with the vehicle-mounted device, wherein:
the vehicle-mounted device includes:
a vehicle side receiver that receives a signal transmitted from the mobile device;
a vehicle side transmission device that periodically transmits a primary request signal to an external periphery of the vehicle, and transmits a secondary request signal to the external periphery of the vehicle when the vehicle side receiver receives a primary response signal transmitted from the mobile device in response to the primary request signal; and
a vehicle side reception control device that controls the vehicle side receiver to receive a secondary response signal transmitted from the mobile device as a signal having a bit rate larger than the primary response signal in response to the secondary request signal; and the mobile device includes:
a mobile device side reception device that receives a signal transmitted from the vehicle-mounted device; and
a mobile device side transmission device that transmits the primary response signal when the mobile device side reception device receives the primary request signal, sets the bit rate of the secondary response signal to be larger than the primary response signal, and transmits the secondary response signal when the mobile device side reception device receives the secondary request signal;
wherein:
the vehicle-mounted device further includes a vehicle side operation unit;
the vehicle side transmission device transmits the primary request signal when the vehicle side operation unit is operated; and
the vehicle side reception control device stops or intermittently performs a signal receiving operation of the primary response signal in the vehicle side receiver until the vehicle side operation unit is operated, and switches the signal receiving operation of the primary response signal to a continuous operation when the vehicle side operation unit is operated.

7. A communication system comprising:
a vehicle-mounted device that is mounted in a vehicle; and
at least one mobile device that is configured to communicate with the vehicle-mounted device, wherein:
the vehicle-mounted device includes:
a vehicle side transmission device that transmits a request signal for requesting a reply to an external periphery of the vehicle or a vehicle compartment;
a vehicle side receiver that receives an operation signal, transmitted from the mobile device based on an event that a mobile device side operation unit of the mobile device is operated, and a response signal transmitted from the mobile device in response to the request signal, the operation signal and the response signal having a transmission distance set to be longer than a transmission distance of the request signal; and
a vehicle side reception control device that controls the vehicle side receiver to receive the operation signal as a first channel signal set to have a first carrier frequency and a first bit rate, and to receive the response signal as a second channel signal set to have a second carrier frequency different from the first carrier frequency and a second bit rate larger than the first bit rate; and
the at least one mobile device includes:
the mobile device side operation unit;
a mobile device side reception device that receives a signal transmitted from the vehicle-mounted device; and
a mobile device side transmission device that transmits the operation signal as the first channel signal when the mobile device side operation unit is operated, and transmits the response signal as the second channel signal when the mobile device side reception device receives the request signal.

* * * * *